United States Patent
Li et al.

(10) Patent No.: US 10,878,826 B2
(45) Date of Patent: Dec. 29, 2020

(54) METHOD AND SYSTEM FOR CONTROLLING MULTIPLE HOME DEVICES

(71) Applicant: MIDEA GROUP CO., LTD., Foshan (CN)

(72) Inventors: Baojie Li, Santa Clara, CA (US); Bihai Peng, Foshan (CN); Liwei Luo, Foshan (CN); Haisong Gu, Cupertino, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 132 days.

(21) Appl. No.: 16/230,797

(22) Filed: Dec. 21, 2018

(65) Prior Publication Data
US 2019/0206411 A1    Jul. 4, 2019

Related U.S. Application Data

(60) Provisional application No. 62/612,620, filed on Dec. 31, 2017.

(51) Int. Cl.
*G10L 17/22* (2013.01)
*G10L 15/26* (2006.01)
(Continued)

(52) U.S. Cl.
CPC .............. *G10L 17/22* (2013.01); *G06F 3/167* (2013.01); *G10L 15/26* (2013.01); *G10L 15/22* (2013.01);
(Continued)

(58) Field of Classification Search
CPC .......... G10L 21/00; G10L 17/00; G10L 15/00
(Continued)

(56) References Cited

U.S. PATENT DOCUMENTS

| | | | |
|---|---|---|---|
| 8,527,278 B2 | 9/2013 | David | |
| 2006/0161635 A1* | 7/2006 | Lamkin | G06F 16/4387 709/217 |

(Continued)

FOREIGN PATENT DOCUMENTS

| | | |
|---|---|---|
| CN | 1031669374 | 6/2013 |
| CN | 1044851074 | 4/2015 |

(Continued)

OTHER PUBLICATIONS

Midea Group Co. Ltd., International Search Report and Written Opinion, PCT/CN2018/116497, dated Feb. 19, 2019, 9 pgs.

*Primary Examiner* — Michael Colucci
(74) *Attorney, Agent, or Firm* — Morgan, Lewis & Bockius LLP

(57) ABSTRACT

System and method for controlling a home assistant device include: receiving an audio input; performing speech-to-text conversion on the audio input to obtain a textual string; searching a name list of multiple home devices to determine whether the textual string includes a respective alias of at least one home device in the name list; in accordance with a determination that the textual string includes a first alias corresponding to a first home device of a first device type, generating a first actionable intent to operate the first home device of the first device type; and in accordance with a determination that the textual string includes a second alias corresponding to a second home device of the first device type that is distinct from the first home device, generating a second actionable intent to operate the second home device of the first device type.

17 Claims, 9 Drawing Sheets

(51) Int. Cl.
   *G06F 3/16* (2006.01)
   *G10L 17/00* (2013.01)
   *G10L 15/22* (2006.01)
   *G10L 21/00* (2013.01)
   *H04L 12/28* (2006.01)

(52) U.S. Cl.
   CPC .............. *G10L 17/00* (2013.01); *G10L 21/00* (2013.01); *H04L 12/2807* (2013.01)

(58) Field of Classification Search
   USPC ........................................................ 704/235
   See application file for complete search history.

(56) References Cited

U.S. PATENT DOCUMENTS

| | | | | |
|---|---|---|---|---|
| 2010/0332235 | A1* | 12/2010 | David | G06F 16/3329 704/275 |
| 2013/0086232 | A1* | 4/2013 | Hwang | H04L 67/303 709/221 |
| 2013/0144951 | A1* | 6/2013 | Viswanath | H04L 67/2823 709/204 |
| 2016/0036764 | A1* | 2/2016 | Dong | H04L 61/3025 370/254 |
| 2016/0104480 | A1* | 4/2016 | Sharifi | G10L 15/285 704/254 |
| 2016/0105424 | A1* | 4/2016 | Logue | H04L 63/0823 726/7 |
| 2016/0112262 | A1* | 4/2016 | Johnson | H04L 61/1511 709/221 |
| 2016/0165650 | A1* | 6/2016 | Kim | H04W 12/003 370/329 |
| 2016/0171374 | A1* | 6/2016 | Kim | H04L 43/16 706/46 |
| 2016/0195864 | A1* | 7/2016 | Kim | H04L 12/2816 709/221 |
| 2016/0197993 | A1* | 7/2016 | Perkowski | H04L 67/02 709/203 |
| 2016/0253651 | A1* | 9/2016 | Park | G07F 9/023 705/39 |
| 2017/0272316 | A1* | 9/2017 | Johnson | H04L 67/141 |
| 2017/0337542 | A1* | 11/2017 | Kim | G06Q 20/367 |
| 2018/0102914 | A1* | 4/2018 | Kawachi | G10L 15/22 |
| 2018/0144590 | A1* | 5/2018 | Mixter | G10L 15/22 |
| 2018/0262388 | A1* | 9/2018 | Johnson | H04L 63/0823 |
| 2019/0362715 | A1* | 11/2019 | Aggarwal | G10L 15/22 |

FOREIGN PATENT DOCUMENTS

| | | |
|---|---|---|
| CN | 105785929 A | 7/2016 |
| CN | 105843069 A | 8/2016 |
| CN | 105974810 A | 9/2016 |

\* cited by examiner

METHOD AND SYSTEM FOR CONTROLLING MULTIPLE HOME DEVICES

CROSS REFERENCE TO RELATED APPLICATION

This application claims priority under Section 119(e) and the benefit of U.S. Provisional Application No. 62/612,620, filed Dec. 31, 2017, the entire disclosure of which is incorporated herein in its entirety.

TECHNICAL FIELD

This disclosure relates generally to digital assistants, and more specifically, to a method and system for controlling a digital assistant using voice-based commands.

BACKGROUND

Recently, voice-based digital assistants, such as Apple's SIRI, Amazon's Echo, Google's Google Assistant, and Microsoft's Cortana, have been introduced into the marketplace to handle various tasks such as home appliance controls, web search, calendaring, reminders, etc. One advantage of such voice-based digital assistants is that users can interact with a device in a hands-free manner without handling or even looking at the device. To initiate the voice-based assistant, users can press a button or select an icon on a touch screen, or speak a trigger phase (e.g., a predefined wake-up command).

In the home appliance control setting, the intent of the user is more difficult to ascertain when there are multiple appliances of the same type in the home. Disambiguation of the user's intent can be performed based on user's past behavior, or based on interactive questions and answers between the digital assistant and the user. However, such interaction is time-consuming and cumbersome, and is computationally expensive.

Thus, it would be beneficial to provide a way to improve the way that multiple devices are controlled by the digital assistant using voice-based commands.

SUMMARY

Accordingly, there is a need for a method to control multiple home devices using a digital assistant, such as a home assistant via voice commands.

The embodiments described below provide systems and methods for controlling multiple devices through a voice-based assistant using a name list for the multiple devices.

In some embodiments, a method for controlling multiple devices using a voice-based assistant includes: receiving an audio input; performing speech-to-text conversion on the audio input to obtain a textual string; searching a name list of multiple home devices to determine whether the textual string includes a respective alias of at least one home device in the name list; in accordance with a determination that the textual string includes a first alias corresponding to a first home device of a first device type, generating a first actionable intent to operate the first home device of the first device type; and, in accordance with a determination that the textual string includes a second alias corresponding to a second home device of the first device type that is distinct from the first home device, generating a second actionable intent to operate the second home device of the first device type.

In accordance with some embodiments, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some embodiments, an electronic device (e.g., a portable electronic device) is provided that comprises means for performing any of the methods described herein.

In accordance with some embodiments, an electronic device (e.g., a portable electronic device) is provided that comprises one or more processors and memory storing one or more programs for execution by the one or more processors, the one or more programs including instructions for performing any of the methods described herein.

In accordance with some embodiments, an information processing apparatus for use in an electronic device is provided, the information processing apparatus comprising means for performing any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Figure 1:
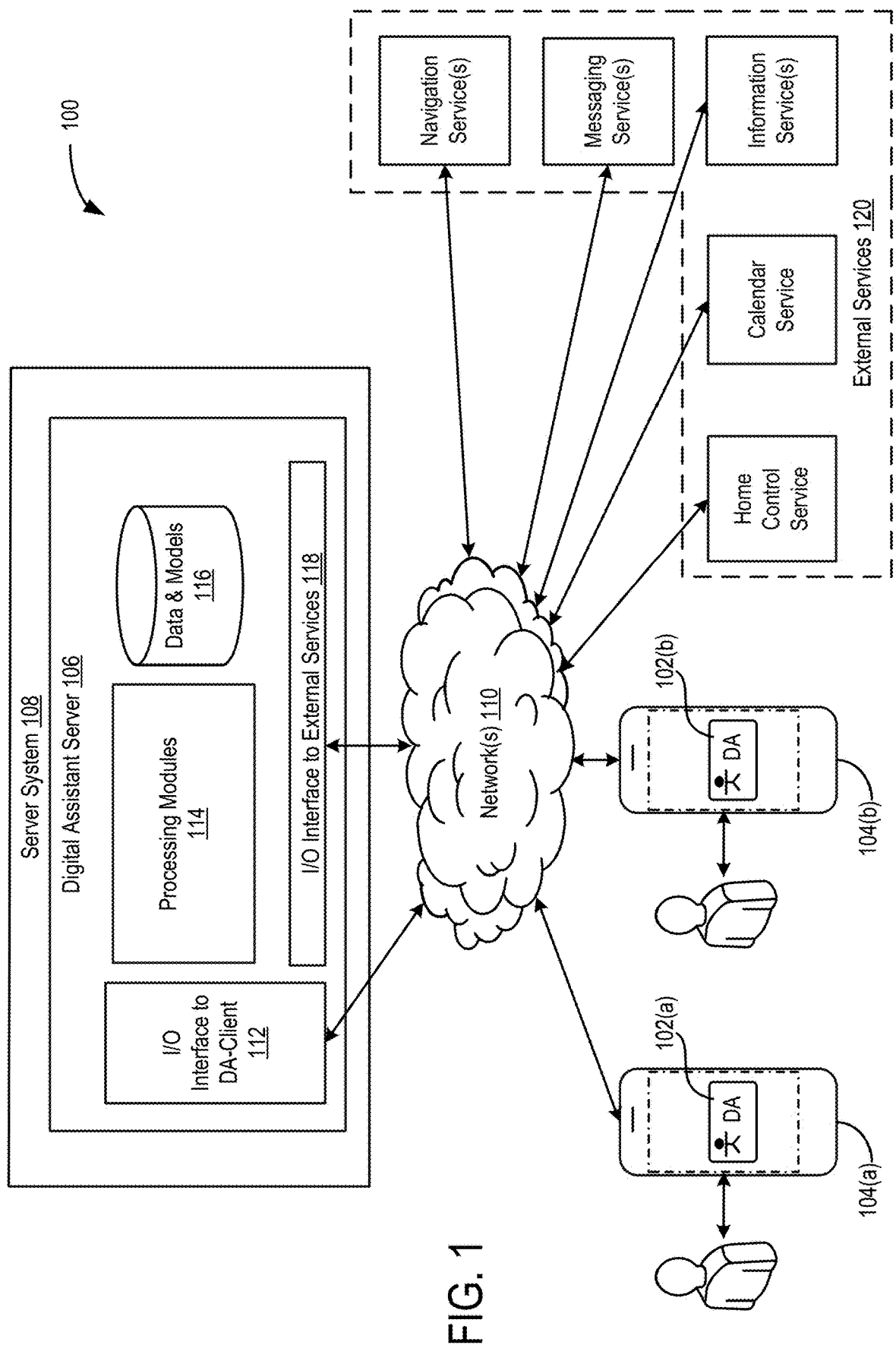
FIG. 1 is a block diagram illustrating an environment in which a digital assistant operates in accordance with some embodiments.

The embodiments described below provide systems and methods for controlling multiple home devices (e.g., including multiple devices of the same type) through a home assistant device using voice commands.

In some embodiments, a voice-based assistant is initiated using a voice trigger at an electronic device. Interactions with a voice-based digital assistant (or other speech-based services, such as a speech-to-text transcription service) often begin when a user presses an affordance (e.g., a button or icon) on a device in order to activate the digital assistant, followed by the device providing some indication to the user that the digital assistant is active and listening, such as a light, a sound (e.g., a beep), or a vocalized output (e.g., "what can I do for you?"). As described herein, voice triggers can also be implemented so that they are activated in response to a specific, predetermined word, phrase, or sound, and without requiring a physical interaction by the user. For example, a user may be able to activate a digital assistant by reciting a predefined trigger phrase "Hey, Assistant!" In response, the device outputs a beep, sound, or speech output (e.g., "what can I do for you?") indicating to the user that the listening mode is active. Accordingly, the user can initiate an interaction with the digital assistant without having to physically touch the device that provides the digital assistant functionality. The digital assistant can be coupled to one or more other devices (e.g., home appliances, smart home devices, etc.) to control functions of these devices.

One technique for initiating a speech-based service with a voice trigger is to have the speech-based service continuously listen for a predetermined trigger word, phrase, or sound (any of which may be referred to herein as "the trigger sound"). However, continuously operating the speech-based service (e.g., the voice-based digital assistant) requires substantial audio processing and battery power. In some embodiments, the trigger sound detector is configured to detect several different trigger sounds, such as a set of words, phrases, sounds, and/or combinations thereof. In some embodiments, different users can predefine different trigger words to use, or give different names to the digital assistant. For example, the digital assistant will respond to the phrases "Hey, ALEX," uttered by one user, and "Wake up, NORA," uttered by another user, provided that these are the trigger phrases defined by these users for the digital assistant.

In a home control setting, multiple devices may be controlled via the digital home assistant. In general, intent deduction and named entity recognition in the user's speech input can be conducted either simultaneously or sequentially. In latter case, the transcribed text corresponding to the speech input is input to intent classifiers (e.g., ontology 360) to determine which task the user wishes to be performed by the digital home assistant. In some embodiments, the natural language processing module of the digital home assistant locates the named entity recognition model of the recognized intent, and passes the text version of the user's speed input to it to obtain the recognized named entities in the input. Performance of intent classifiers relies much on the literal text. For example, if a text contains words 'air-conditioner' and 'temperature', then the intent would be most possibly 'ac_set_temperature'. However, if there are more than one air-conditioners in a home, disambiguation is difficult, unless the user's speech input includes the necessary disambiguation information (e.g., the user's input includes location information or other description of the air-conditioner, e.g., "bedroom air conditioner, baby's air conditioner, etc."). As disclosed herein, each of multiple home devices of the same type is given a unique alias that is not required to include descriptive information related to the device, such like 'dog' for the living room air-conditioner, 'cat' for bedroom air-conditioner. Since aliases might not contain some keywords that the natural language processing module of the digital assistant can use for intents deduction, the intent classifiers will lose its accuracy and result in subsequent incorrect operations. This explains why current home appliances controlling systems cannot handle more than one device of a single appliance type simultaneously using voice input. Some systems tried some approaches to control multiple devices non-simultaneously.

For example, if there are two air-conditioners in a home, one in living room another in bedroom. When a user stays in living room and wants to operate on the living room air conditioner, he/she sets the living room air-conditioner as the default command receiver using a settings graphical user interface on a user device. When the user moves to the bedroom and wants to operate the bedroom air conditioner, he/she switches the default command receiver to the bedroom air-conditioner using the graphical user interface. Otherwise, the user would have to explicitly state the location descriptor of the air conditioner in order to operate the correct air conditioner. Alternatively, the location of the user is used to guess which air conditioner the user intends to operate. However, this estimation is often incorrect, since it is possible that the user may wish to operate an air conditioner in a different room. Using the alias names avoid the issues with these other solutions, and each user can choose aliases that make sense to him/herself and the intent deduction is much more effective and efficient once the aliases are provided to the digital assistant during the device registration stage.

FIG. 1 is a block diagram of an operating environment 100 of a digital home assistant according to some embodiments. The terms "home assistant", "digital assistant," "virtual assistant," "intelligent automated assistant," "voice-based digital assistant," "voice assistant", or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, once initiated, a home assistant system is capable of accepting a user request at least partially in the form of a natural language command, request, statement, narrative, and/or inquiry. Typically, the user request seeks either an informational answer or performance of a task by the home assistant system. A satisfactory response to the user request is generally either provision of the requested informational answer, performance of the requested task, or a combination of the two. For example, a user may ask the digital assistant system a question, such as "What is the temperature in the room right now?" Based on the user's current location, and the ambient temperature, the digital assistant may answer, "The room temperature is 80 degrees." The user may also request the performance of a task, for example, by stating, "Please turn on the air conditioner." In response, the home assistant may acknowledge the request by generating a voice output, "Yes, right away," and then proceed to turn on the air conditioner in the room through a predefined control API of the air conditioner. There are numerous other ways of interacting with a home assistant to request information or performance of various tasks. In addition to providing verbal responses and taking programmed actions, the home assistant can also provide responses in other visual or audio forms (e.g., as text, alerts, music, videos, animations, etc.).

As shown in FIG. 1, in some embodiments, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device or electronic device).

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on the deduced user intent. In some embodiments, the DA server 106 communicates with external services 120 (e.g., navigation service(s), messaging service(s), information service(s), calendar services, home appliance control service(s), etc.) through the network(s) 110 for task completion or information acquisition. The I/O interface to the external services 118 facilitates such communications.

Examples of the user device 104 include, but are not limited to, a home control center device, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoW), Wi-MAX, or any other suitable communication protocol.

The server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client side portion (e.g., the DA client 102) and a server-side portion (e.g., the DA server 106), in some embodiments, a digital assistant system refers only to the server-side portion (e.g., the DA server 106). In some embodiments, the functions of a digital assistant can be implemented as a standalone application installed on a user device. In addition, the divisions of functionalities between the client and server portions of the digital assistant can vary in different embodiments. For example, in some embodiments, the DA client 102 is a thin-client that provides only user-facing input and output processing functions, and delegates all other functionalities of the digital assistant to the DA server 106. In some other embodiments, the DA client 102 is configured to perform or assist one or more functions of the DA server 106.

Figure 2:
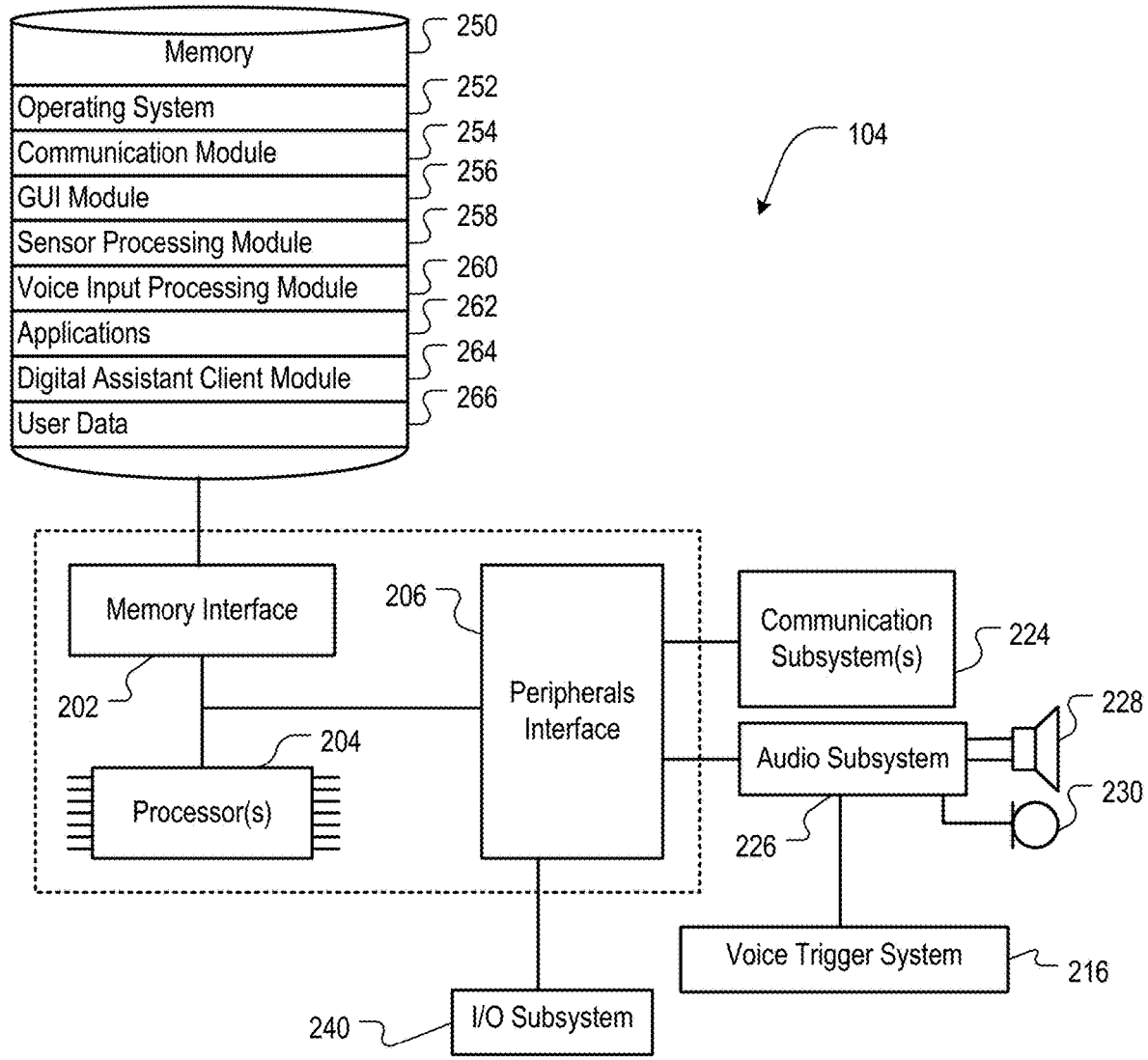
FIG. 2 is a block diagram illustrating a digital assistant client system in accordance with some embodiments.

FIG. 2 is a block diagram of a user device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

In some embodiments, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters.

In some embodiments, the user device 104 includes an audio subsystem 226 coupled to one or more speakers 228 and one or more microphones 230 to facilitate voice-enabled functions, such as voice recognition, voice replication, digital recording, and telephony functions. In some embodiments, the audio subsystem 226 is coupled to a voice trigger system 216. In some embodiments, the voice trigger system 216 and/or the audio subsystem 226 includes low-power audio circuitry and/or programs (i.e., including hardware and/or software) for receiving and/or analyzing sound inputs, including, for example, one or more analog-to-digital converters, digital signal processors (DSPs), sound detectors, memory buffers, codecs, and the like. In some embodiments, the low-power audio circuitry (alone or in addition to other components of the user device 104) provides voice (or sound) trigger functionality for one or more aspects of the user device 104, such as a voice-based digital assistant or other speech-based service. In some embodiments, the low-power audio circuitry provides voice trigger functionality even when other components of the user device 104 are shut down and/or in a standby mode, such as the processor(s) 204, I/O subsystem 240, memory 250, and the like. In some embodiments, the voice trigger system 216 interfaces or includes a speaker recognition system that facilitates speaker-specific voice trigger functionality for the digital assistant.

In some embodiments, an I/O subsystem 240 is also coupled to the peripheral interface 206. The I/O subsystem 240 includes input and output controllers for various input and output devices, such as touch-screen displays, touchpad, keyboard, infrared port, USB port, and/or a pointer device such as a stylus.

The memory interface 202 is coupled to memory 250. In some embodiments, memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some embodiments, memory 250 stores an operating system 252, a communications module 254, a graphical user interface module 256, a sensor processing module 258, a voice input processing module 260, applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The voice-input processing module 260 facilitates voice input processing processes and functions. The application module 262 facilitates various functionalities of user applications, such as electronic-messaging, web browsing, media processing, navigation, home appliance control and/or other processes and functions. In some embodiments, the user device 104 stores in memory 250 one or more software applications each associated with at least one of the external service providers.

As described above, in some embodiments, memory 250 also stores client-side digital assistant instructions (e.g., in a digital assistant client module 264) and various user data 266 (e.g., user speech samples, user voice prints, user-specific vocabulary data, preference data, and/or other data such as the user's electronic address book or contact list, to-do lists, shopping lists, user's preferences for home appliances, etc.) to provide the client-side functionalities of the digital assistant.

In various embodiments, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some embodiments, the digital assistant client module 264 utilizes various sensors, subsystems and peripheral devices to gather additional information from the surrounding environment of the user device 104 to establish a context associated with a user input. In some embodiments, the digital assistant client module 264 provides the context information or a subset thereof with the user input to the digital assistant server (e.g., the digital assistant server 106, FIG. 1) to help deduce the user's intent.

In some embodiments, memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
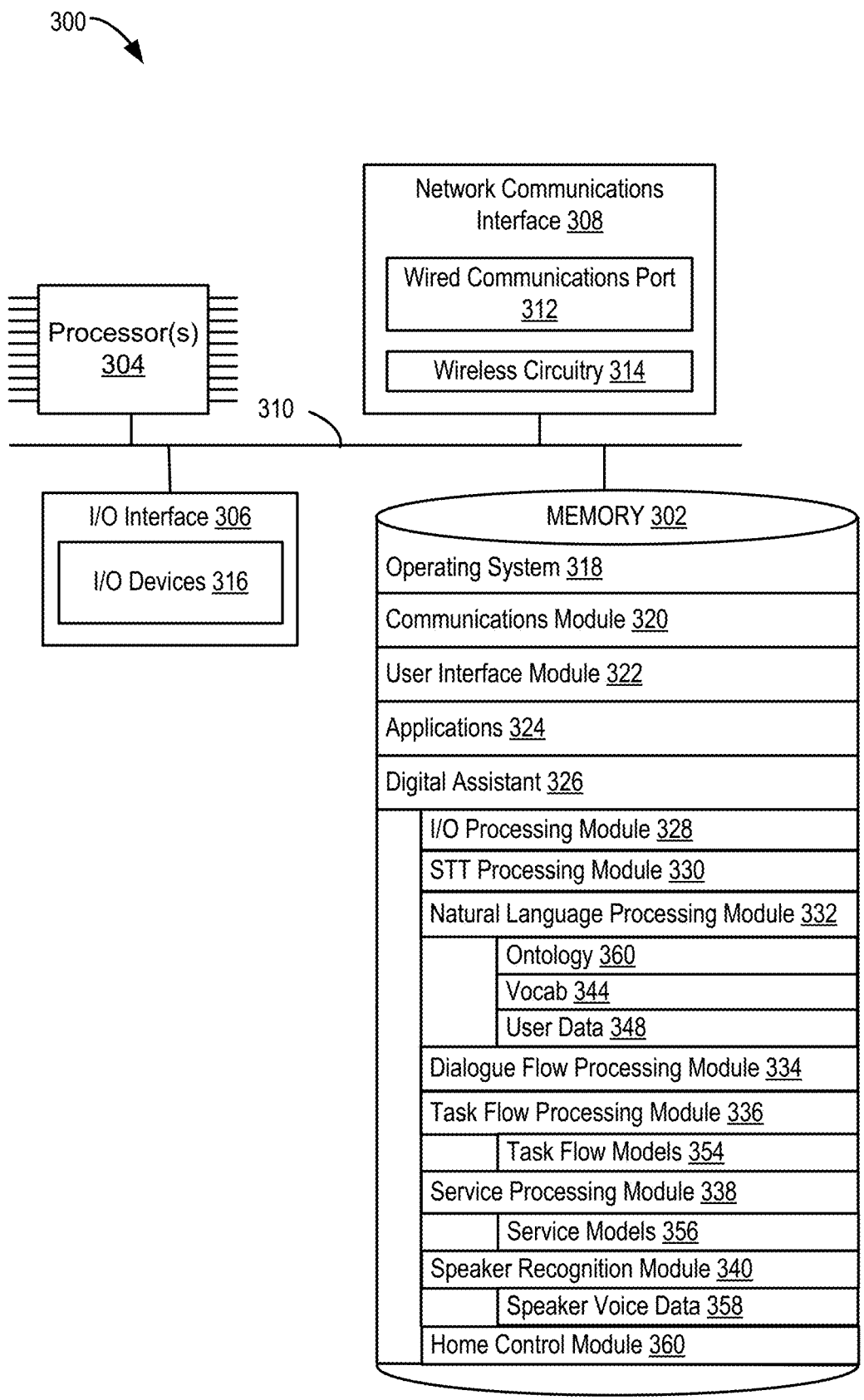
FIG. 3A is a block diagram illustrating a standalone digital assistant system or a digital assistant server system in accordance with some embodiments.

FIG. 3A is a block diagram of an exemplary home assistant system 300 (also referred to as the digital assistant) in accordance with some embodiments. In some embodiments, the home assistant system 300 is implemented on a standalone computer system. In some embodiments, the home assistant system 300 is distributed across multiple computers. In some embodiments, some of the modules and functions of the home assistant are divided into a server portion and a client portion, where the client portion resides on a user device (e.g., the user device 104) and communicates with the server portion (e.g., the server system 108) through one or more networks, e.g., as shown in FIG. 1. In some embodiments, the home assistant system 300 is an embodiment of the server system 108 (and/or the home assistant server 106) shown in FIG. 1. In some embodiments, the home assistant system 300 is implemented in a user device (e.g., the user device 104, FIG. 1), thereby eliminating the need for a client-server system. It should be noted that the home assistant system 300 is only one example of a home assistant system, and that the home assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The home assistant system 300 includes memory 302, one or more processors 304, an input/output (I/O) interface 306, and a network communications interface 308. These components communicate with one another over one or more communication buses or signal lines 310.

In some embodiments, memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the home assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some embodiments, when the home assistant is implemented on a standalone user device, the home assistant system 300 includes any of the components and I/O and communication interfaces described with respect to the user device 104 in FIG. 2 (e.g., one or more microphones 230). In some embodiments, the home assistant system 300 represents the server portion of a home assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the home assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some embodiments, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as home control center, games, a calendar application, a navigation application, or an email application. If the home assistant system 300 is implemented on a server farm, the applications 324 may include resource management applications, diagnostic applications, or scheduling applications, for example.

Memory 302 also stores the home assistant module (or the server portion of a home assistant) 326. In some embodiments, the home assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a speaker recognition module 340. Each of these processing modules has access to one or more of the following data and models of the home assistant 326, or a subset or superset thereof: ontology 360, vocabulary index 344, user data 348, task flow models 354, service models 356, speaker voice models 358.

In some embodiments, using the processing modules (e.g., the input/output processing module 328, the speaker recognition module 340, the STT processing module 330, the natural language processing module 332, the dialogue flow processing module 334, the task flow processing module 336, and/or the service processing module 338), data, and models implemented in the digital assistant module 326, the home assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some embodiments, the home assistant also takes appropriate actions when a satisfactory response was not or could not be provided to the user for various reasons. In some embodiments, the memory includes a home control module 360 that utilizes the APIs of the home control services to control different home appliances that are registered with the digital assistant system in accordance with user commands and user intent that are deduced from the user's voice inputs.

Figure 3B:
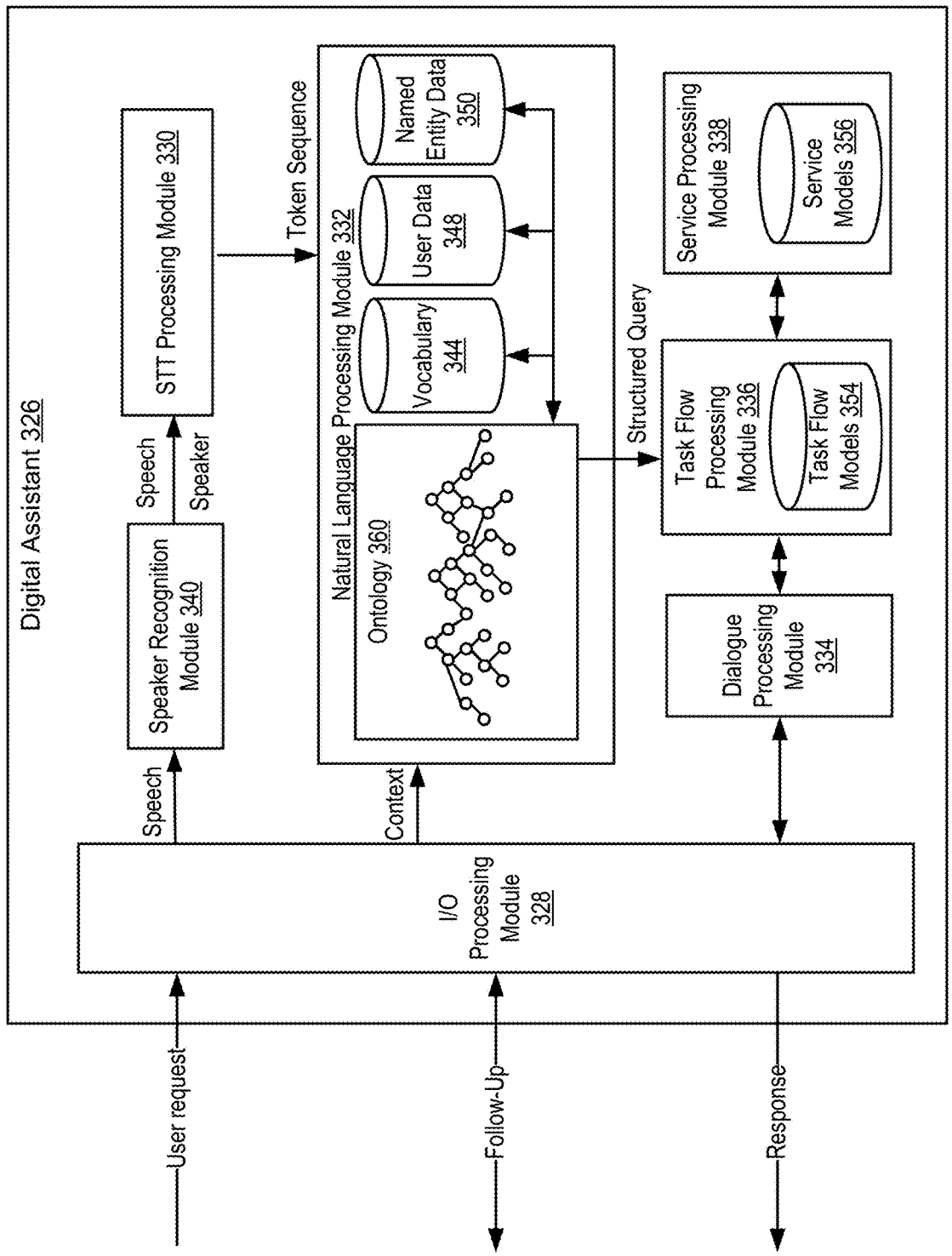
FIG. 3B is a block diagram illustrating functions of the digital assistant shown in FIG. 3A in accordance with some embodiments.

As shown in FIG. 3B, in some embodiments, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. In some embodiments, when a user request is received by the I/O processing module 328 and the user request contains a speech input, the I/O processing module 328 forwards the speech input to speaker recognition module 340 for speaker recognition and subsequently to the speech-to-text (STT) processing module 330 for speech-to-text conversions. In some embodiments, person-specific speech-to-text models are selected to perform the speech-to-text conversion based on the speaker recognition result.

In some embodiments, the speech-to-text processing module 330 receives speech input (e.g., a user utterance captured in a voice recording) through the I/O processing module 328 or the speaker recognition module 340. In some embodiments, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the home assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some embodiments, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes.

An actionable intent node, along with its linked concept nodes, may be described as a "domain." In the present discussion, each domain is associated with a respective actionable intent, and refers to the group of nodes (and the relationships therebetween) associated with the particular actionable intent.

In some embodiments, the ontology 360 includes all the domains (and hence actionable intents) that the digital assistant is capable of understanding and acting upon. In some embodiments, the ontology 360 may be modified, such as by adding or removing domains or nodes, or by modifying relationships between the nodes within the ontology 360.

In some embodiments, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some embodiments, the natural language processor 332 shown in FIG. 3B receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the home assistant system 300 has previously correctly interpreted a similar request from a user.

In some embodiments, the digital assistant system 300 also stores names of specific entities in the named entity database 350, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the named entity database 305 also includes the aliases of the home devices that are provided by individual users during the device registration stage for the different home devices. In some embodiments, the digital assistant system 300 can search and identify specific entity names from other data sources, such as the user's address book or contact list, a movies database, a musicians database, and/or a restaurant database. In some embodiments, when the natural language processor 332 identifies that a word in the token sequence is a name of a specific entity (such as a name in the user's address book or contact list, or in the name list of the home devices), that word is given additional significance in selecting the actionable intent within the ontology for the user request. In some embodiments, the trigger phrase for the digital assistant is stored as a named entity, so that it can be identified and given special significance when it exists in the speech input of the user.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request. In some embodiments, the user data also includes the user's specific voiceprint or speech samples for speaker recognition training.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say, "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, if the user requested a sushi restaurant "near me," the natural language processor 332 may populate a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some embodiments, the various procedures necessary to complete these tasks are provided in task flow models 354. In some embodiments, the task flow models 354 include procedures for obtaining additional information from the user, and task flows for performing actions associated with the actionable intent. In some embodiments, he task flows in the task flow models 354 describe the steps for controlling each home device that is registered with the home assistant, and based on the device name list the digital assistant operates to execute the steps in a suitable task flow with respect to the home device that is specified by the alias of the home device in the user's speech input.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some embodiments, the dialogue processing module 334 determines how (and/or when) to ask the user for the additional information, and receives and processes the user responses. In some embodiments, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Continuing with the example above, when the task flow processor 336 invokes the dialogue processor 334 to determine the "party size" and "date" information for the structured query associated with the domain "restaurant reservation," the dialogue processor 334 generates questions such as "For how many people?" and "On which day?" to pass to the user. Once answers are received from the user, the dialogue processing module 334 populates the structured query with the missing information, or passes the information to the task flow processor 336 to complete the missing information from the structured query.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar. In another example, described in greater detail below, the task flow processor 336 executes steps and instructions associated with tagging or searching for digital photographs in response to a voice input, e.g., in conjunction with photo module 132.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to send a command to a home appliance, make a phone call, set a calendar entry, invoke a map search, invoke or interact with other user applications installed on the user device, and invoke or interact with third party services (e.g. a restaurant reservation portal, a social networking website or service, a banking portal, etc.,). In some embodiments, the protocols and application programming interfaces (API) required by each service can be specified by a respective service model among the service models 356. The service processor 338 accesses the appropriate service model for a service and generates requests for the service in accordance with the protocols and APIs required by the service according to the service model.

In some embodiments, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

Figure 4:
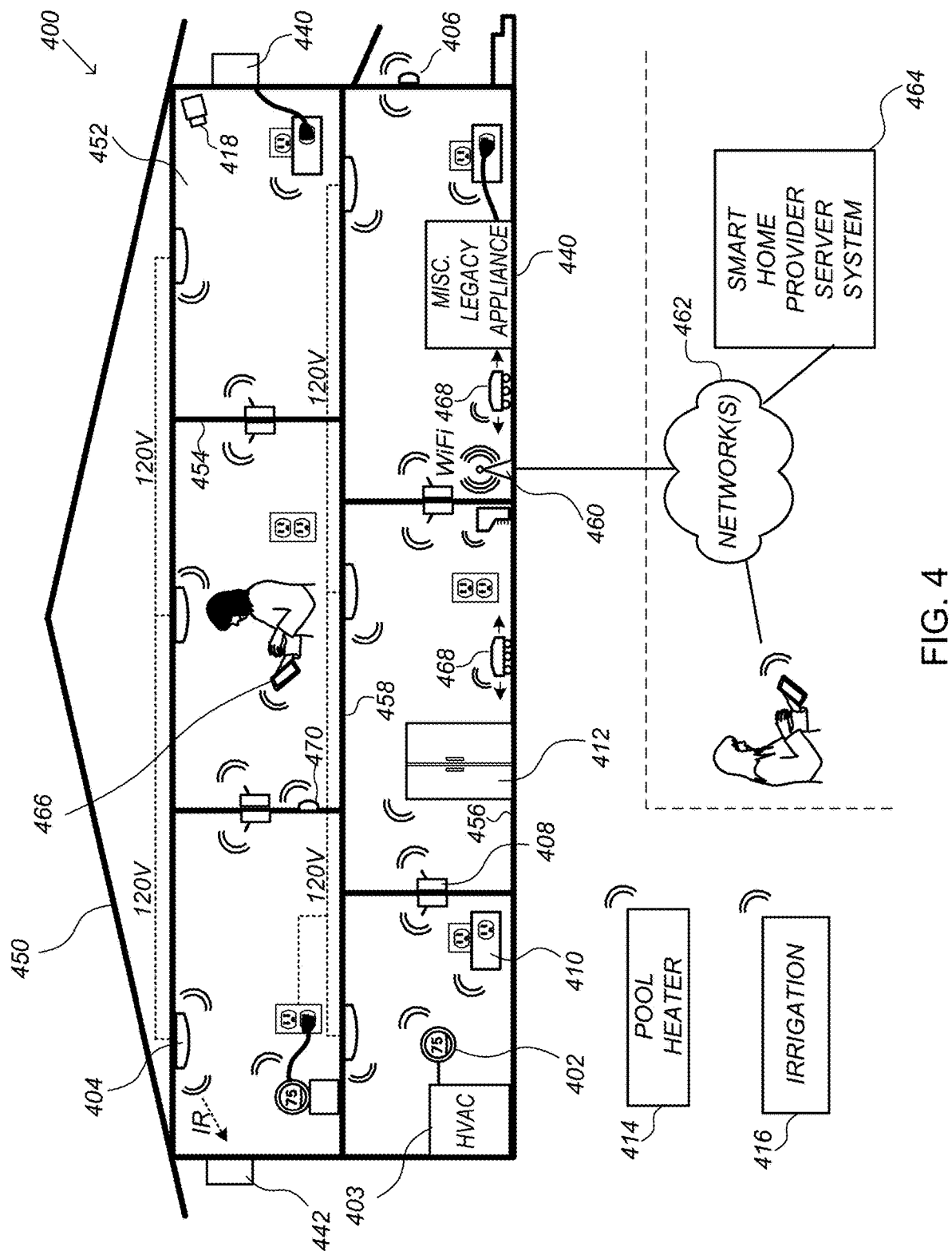
FIG. 4 is a smart home environment including multiple home devices that are controllable by a digital home assistant in accordance with some embodiments.

FIG. 4 is an exemplary smart home environment in accordance with some implementations. Smart home environment 400 includes a structure 450, which is optionally a house, office building, garage, or mobile home. It will be appreciated that devices may also be integrated into a smart home environment 400 that does not include an entire structure 450, such as an apartment, condominium, or office space. Further, the smart home environment may control and/or be coupled to devices outside of the actual structure 450. Indeed, several devices in the smart home environment need not be physically within the structure 450. For example, a device controlling a pool heater 414 or irrigation system 416 may be located outside of structure 450.

The depicted structure 450 includes a plurality of rooms 452, separated at least partly from each other via walls 454. The walls 454 may include interior walls or exterior walls. Each room may further include a floor 456 and a ceiling 458. Devices may be mounted on, integrated within and/or supported by a wall 454, floor 456 or ceiling 458.

In some implementations, the smart home environment 400 includes a plurality of devices, including intelligent, multi-sensing, network-connected devices, that integrate seamlessly with each other in a smart home network (e.g., 202 FIG. 2) and/or with a central server or a cloud-computing system to provide a variety of useful smart home functions. The smart home environment 400 may include one or more intelligent, multi-sensing, network-connected thermostats 402 (hereinafter referred to as "smart thermostats 402"), one or more intelligent, network-connected, multi-sensing hazard detection units 404 (hereinafter referred to as "smart hazard detectors 404"), and one or more intelligent, multi-sensing, network-connected entryway interface devices 406 (hereinafter referred to as "smart doorbells 406"). In some implementations, the smart thermostat 402 detects ambient climate characteristics (e.g., temperature and/or humidity) and controls a HVAC system 403 accordingly. The smart hazard detector 404 may detect the presence of a hazardous substance or a substance indicative of a hazardous substance (e.g., smoke, fire, and/or carbon monoxide). The smart doorbell 406 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 400 includes one or more intelligent, multi-sensing, network-connected wall switches 408 (hereinafter referred to as "smart wall switches 408"), along with one or more intelligent, multi-sensing, network-connected wall plug interfaces 410 (hereinafter referred to as "smart wall plugs 410"). The smart wall switches 408 may detect ambient lighting conditions, detect room-occupancy states, and control a power and/or dim state of one or more lights. In some instances, smart wall switches 408 may also control a power state or speed of a fan, such as a ceiling fan. The smart wall plugs 410 may detect occupancy of a room or enclosure and control supply of power to one or more wall plugs (e.g., such that power is not supplied to the plug if nobody is at home).

In some implementations, the smart home environment 400 of FIG. 4 includes a plurality of intelligent, multi-sensing, network-connected appliances 412 (hereinafter referred to as "smart appliances 412"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 440, such as old conventional washer/dryers, refrigerators, and the like, which may be controlled by smart wall plugs 410. The smart home environment 400 may further include a variety of partially communicating legacy appliances 442, such as infrared ("IR") controlled wall air conditioners or other IR-controlled devices, which may be controlled by IR signals provided by the smart hazard detectors 404 or the smart wall switches 408.

In some implementations, the smart home environment 400 includes one or more network-connected cameras 418 that are configured to provide video monitoring and security in the smart home environment 400.

The smart home environment 400 may also include communication with devices outside of the physical home but within a proximate geographical range of the home. For example, the smart home environment 400 may include a pool heater monitor 414 that communicates a current pool temperature to other devices within the smart home environment 400 and/or receives commands for controlling the pool temperature. Similarly, the smart home environment 400 may include an irrigation monitor 416 that communicates information regarding irrigation systems within the smart home environment 400 and/or receives control information for controlling such irrigation systems.

By virtue of network connectivity, one or more of the smart home devices of FIG. 4 may further allow a user to interact with the device even if the user is not proximate to the device. For example, a user may communicate with a device using a computer (e.g., a desktop computer, laptop computer, or tablet) or other portable electronic device (e.g., a smartphone) 466. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 400 using a network-connected computer or portable electronic device 466. In some examples, some or all of the occupants (e.g., individuals who live in the home) may register their device 466 with the smart home environment 400. Such registration may be made at a central server to authenticate the occupant and/or the device as being associated with the home and to give permission to the occupant to use the device to control the smart devices in the home. An occupant may use their registered device 466 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 466, the smart home environment 400 may make inferences about which individuals live in the home and are therefore occupants and which devices 466 are associated with those individuals. As such, the smart home environment may "learn" who is an occupant and permit the devices 466 associated with those individuals to control the smart devices of the home.

In some implementations, in addition to containing processing and sensing capabilities, devices 402, 404, 406, 408, 410, 412, 414, 416 and/or 418 (collectively referred to as "the smart devices") are capable of data communications and information sharing with other smart devices, a central server or cloud-computing system, and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol, including communication protocols not yet developed as of the filing date of this document.

In some implementations, the smart devices serve as wireless or wired repeaters. For example, a first one of the smart devices communicates with a second one of the smart devices via a wireless router. The smart devices may further communicate with each other via a connection to one or more networks 462, such as the Internet. Through the one or more networks 462, the smart devices may communicate with a smart home provider server system 464 (also called a central server system and/or a cloud-computing system herein). In some implementations, the smart home provider server system 464 may include multiple server systems each dedicated to data processing associated with a respective subset of the smart devices (e.g., a video server system may be dedicated to data processing associated with camera(s) 418). The smart home provider server system 464 may be associated with a manufacturer, support entity, or service provider associated with the smart device. In some implementations, a user is able to contact customer support using a smart device itself rather than needing to use other communication means, such as a telephone or Internet-connected computer. In some implementations, software updates are automatically sent from the smart home provider server system 464 to smart devices (e.g., when available, when purchased, or at routine intervals).

In some embodiments, one or more of the smart devices in the home include open audio input channels that can capture audio input in their vicinity and serve as the audio input device for a home assistant (e.g., home assistant 106, 104, 300, and/or 326) that controls all the smart devices installed in the home. In some embodiments, one of the smart devices also include the digital assistant module and serves as the home assistant that manages all the smart devices installed in the home. In some embodiments, a standalone home assistant device exists independent of the portable devices 466 and the smart home devices installed in the home, and the standalone home assistance device receives and respond to voice inputs from multiple members of the household living in the home. In some embodiments, there may be multiple home assistant devices distributed throughout the house that operate independently or in cooperation with one another when controlling the smart devices installed in the home.

Figure 5A:
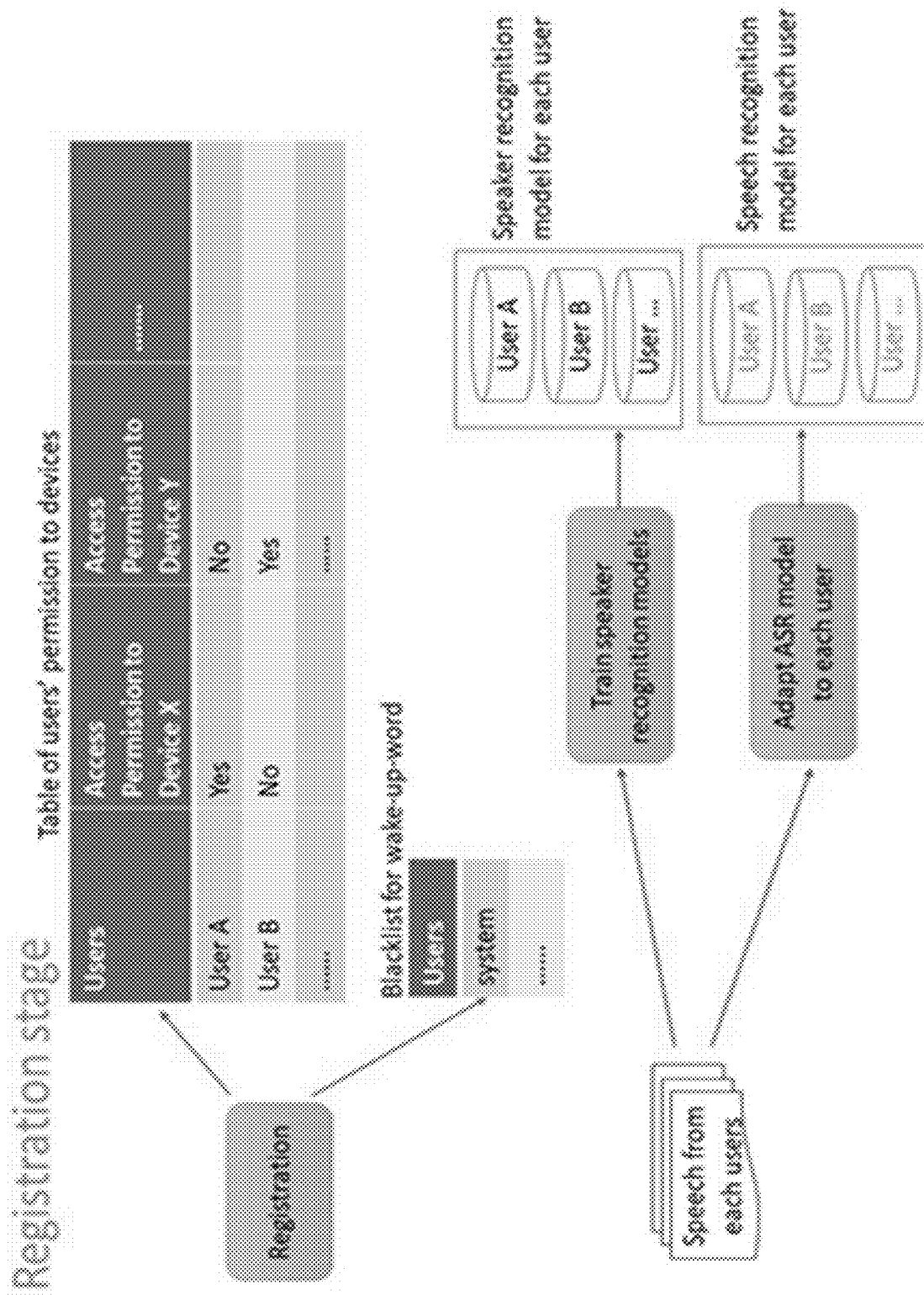
FIGS. 5A-5C are block diagrams illustrating a speaker registration stage, a home device registration stage, and an operation stage for a digital assistant system for controlling the home devices, in accordance with some embodiments.
Figure 5B:
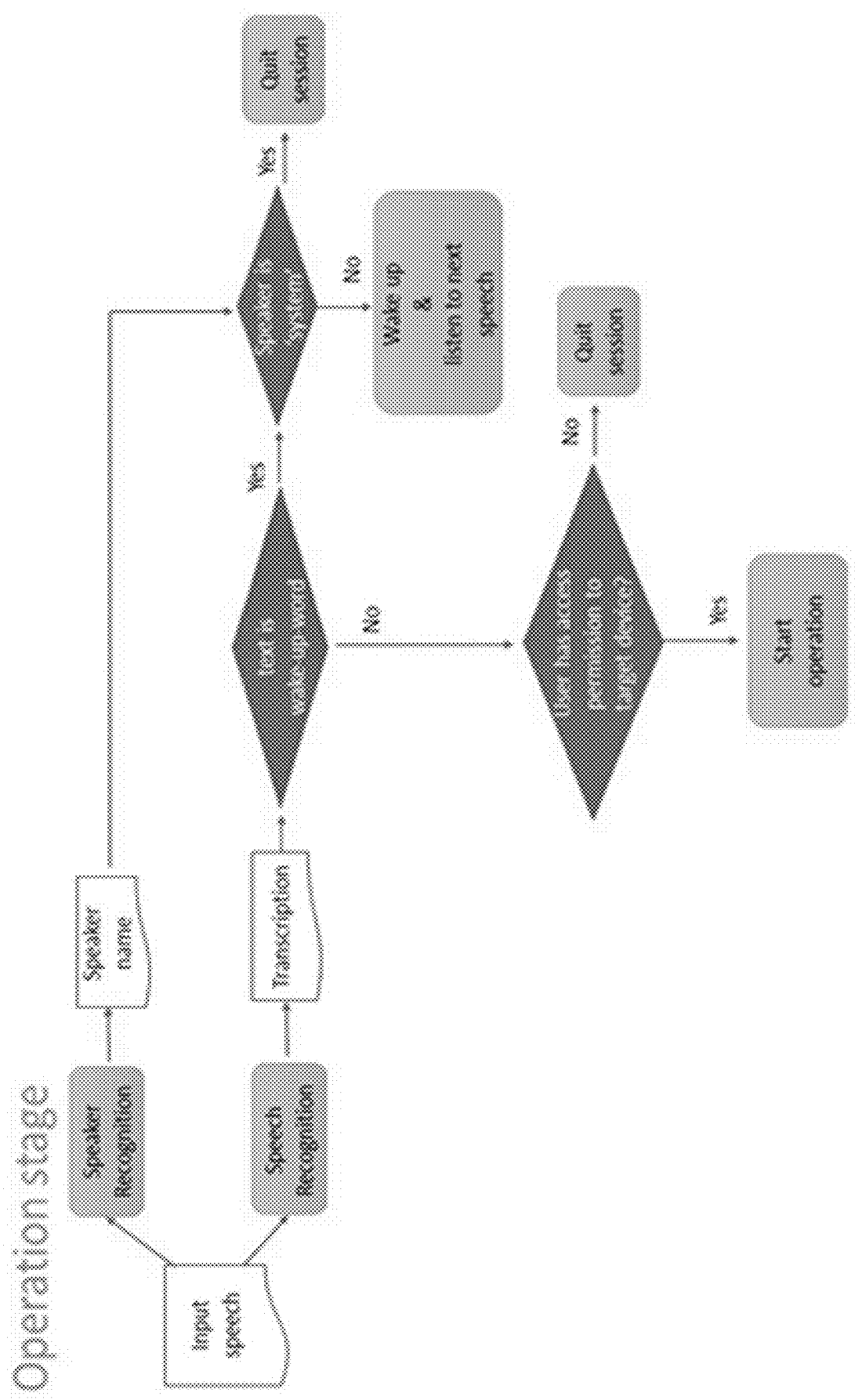
Figure 5C:
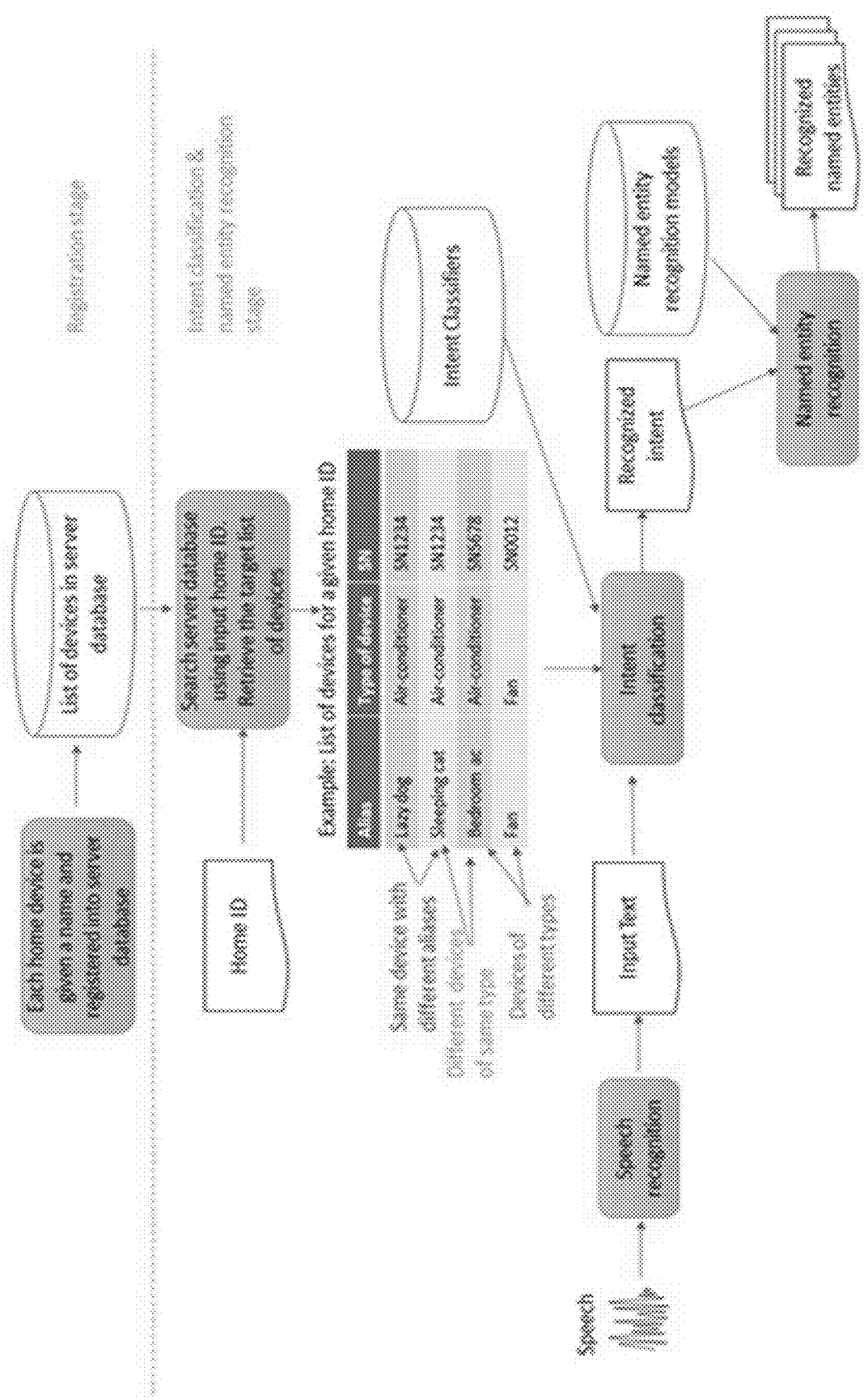

FIGS. 5A-5C are block diagrams illustrating the method and systems for controlling a home assistant based on speaker recognition and named list for multiple home devices in accordance with some embodiments.

In some embodiments, a preset trigger word includes a single word or a phrase that is predefined for activating or waking the home assistant and process a voice command. The trigger word is also referred to as a wake-up-word. When a home assistant device receives a voice input from a user. The voice input is transcribed into a textual string by an automated speech recognition (ASR) module using a speech-to-text conversion model. If the home assistant device detects that the text string contains the preset wake-up-word, then the device is waken up and ready to receive next voice commands and/or process the voice input to determine if the voice input already contains a voice command.

The conventional mechanism for processing the voice input has the following issues. First, due to ambient noise and speaker's accents and voice quality, the device are often activated by mistake by similar sounding speech, or background noise, if the confidence threshold for recognizing the trigger word is set low to increase the sensitivity to the trigger word. However, if the confidence threshold for recognizing the trigger word is set higher to reduce the device's sensitivity to the trigger word and improve the recognition accuracy, the device are often not able to be woken up by the trigger word uttered by a user. A default speech-to-text conversion model has accommodate many people's voices and speech patterns, therefore, selecting the most appropriate confidence threshold for recognition of the trigger word is difficult. Some researchers have suggested training user-specific speech-to-text models using individual user's speech samples. However, it is simply not practical to have each user provide enough speech samples to build a while speech-to-text conversion model entirely using the user's own speech samples. Gradually retraining the speech-to-text model during use is also less than ideal. A home assistant is often used by multiple users in the same household; and gathering all speech inputs and adding them to the training corpus without differentiating between the different users that uttered those speech inputs will not improve the accuracy of the speech-to-text conversion model. Instead, such retraining may worsen the accuracy of the speech-to-text model for the household due to the conflicting training materials that are fed to the speech-to-text conversion model. Thus, adjusting confidence score without the most appropriate speech-to-text conversion model and adding user speech inputs to continually train the speech-to-text conversion model without performing speaker recognition first on the speech inputs and then biasing a default speech-to-text model for the household for each individual member of the household do not work well in practice. The home assistant behaves slightly differently from a digital assistant that resides on a personal handheld device in that a home assistant device receives voice input from multiple members of the household, and a single speech-to-text model does not work well for all members of the household. In addition, retraining the speech-to-text conversion model is different from simply biasing the default speech-to-text conversion model. Retraining is much more time consuming and requires many more training samples than simply biasing the means of the acoustic models of the speech-to-text conversion model based on a small number of speech samples from a respective user to generate the user-specific speech-to-text conversion model for the respective user.

Another common issue with using a trigger word to activate a home assistant that is always keeping the audio input channel open and searching for the trigger word is that the home assistant can be activated by its own voice. The problematic scenario is when the home assistant is already activated and in the process of outputting some speech output using a system voice (e.g., a preset voice that simulates a human voice), and the speech output of the system includes the trigger word. One way of addressing this issue is to close the audio input channel when the system is generating a speech output, however, that means the home assistant will not be able to respond to the user's command to interrupt the home assistant while the home assistant is producing speech output.

Another issue with the conventional home assistant is that there are multiple users in the same household that are authorized to control the home assistant. However, it may not be desirable to have the different members of the same household all have the same access to all the functions and devices controlled through the home assistant. For example, a child in the household should be able to use the home assistant to adjust the air conditioner in the room, but not to alter the security system of the house. In another example, a cleaning staff in an office should be able to use the home assistant to turn off all lights in the office building, but not to operate the printers. One possible solution is to establish speaker recognition and prohibit the home assistant from executing a requested task after the speech-to-text conversion is completed and intent deduction is performed on the textual version of the user's input to ascertain the user's intent. However, using the whole intent deduction capabilities of the home assistant to deduce the user's intent and only then determines that the user's intent is for carrying out a prohibited task is wasteful. Therefore, it is more beneficial to identify the speaker, and only use a subset of the intent deduction capabilities to deduce an intent that is permitted for the user. In other words, if the user is not permitted to operate the printer through the digital assistant, the digital assistant will not activate the domains related to printer operations when performing the intent deduction for the textual version of the user's voice input. The digital assistant when receiving an unauthorized command will respond as if it does not understand the unauthorized command. For example, the digital assistant will say, "I am sorry, I cannot do that" or "I am sorry, but I do not understand your command." This way, the intent deduction is faster and the resolution of the user's input can be arrived faster as well.

In this disclosure, speaker recognition technology is integrated into the digital assistant systems, particularly in the case of a home assistant used in a multimember household, to address the above-mentioned issues. After the speaker of a voice input is ascertained, appropriate user-specific actions can be taken by the digital assistant systems.

In some embodiments, the automatic speech recognition models used by the digital assistant are adapted to the registered users for a household using sample speech inputs recorded for each user beforehand. For example, during a registration process, each authorized user of the digital assistant is required to utter a number of sample speech inputs which are used to bias the acoustic models of the speech-to-text conversion models for each individual user and to generate user-specific speech-to-text conversion models for the individual user. These speech samples are also used to train a speaker recognition model that can distinguish the voice inputs from different users in the household, and distinguish the users of the household versus a guest user. In some embodiments, the voice of the digital assistant system is prestored and processed, such that the voice of the digital assistant can be recognized using the speaker recognition model as well. In some embodiments, each household member may choose a unique simulated voice for the digital assistant, and each of the simulated voice for the digital assistant is stored and used to identify the voice of the digital assistant. If a voice input received by the digital assistant matches any of the simulated voice that the members of the household has selected for the digital assistant, then the digital assistant ignores the trigger word identified in the voice input, and does not activate the intent deduction for the voice input or a subsequently received voice input immediately following the voice input. In some embodiments, there may be multiple digital assistants that are located in proximity to one another in the house, and each digital assistant's simulated voice is stored, and the voice input received in one digital assistant's audio input channel does not activate any digital assistant and does not trigger intent deduction if the voice input is determined to match the simulated voice of one of the digital assistants in the household. In some embodiments, each simulated voice for each digital assistant has a corresponding user-specific and assistant-specific acoustic model for detecting the trigger word that is generated by using a small set of voice samples from the different digital assistants in the different simulated voices. In some embodiments, the digital assistant or a server thereof maintains a blacklist for the system voices for wake-up-word detection. This helps to avoid the intent deduction process of the digital system being triggered by the digital assistant's own speech output or the speech output of a neighboring digital assistant.

In some embodiments, after having received a voice input, speaker recognition process is performed first. If the speaker is recognized as one of the registered users of the household, then the digital assistant or a server thereof uses the speaker dependent speech-to-text model for the recognized speaker to do the speech recognition. This will help to improve recognition accuracy. Given the higher recognition accuracy, more room for increasing confidence score for detecting the wake-up-word is created in automated speech recognition process.

In some embodiments, when an audio input is detected, the speaker recognition is performed on the audio input, and if the audio input does not match any of the registered speakers of the household, the audio input is treated as background noise and is discarded. In some embodiments, the threshold for recognizing background noise versus speech is increased when user-specific acoustic models are used than when a generic or default acoustic model for the whole household is used.

In some embodiments, the digital assistant system refers to a lookup table to determine if the recognized user that uttered the speech input is allowed to operate or access all functions that the digital assistant is capable of performing. In accordance with a determination that the user only has permission to access a subset of all the functions, the digital assistant identifies the domains that the user has permission to access, and performs intent deduction from the text version of the user's speech input only using the domains that the user has permission to access.

In some embodiments, the digital assistant system can remember personal settings for each user and bring back their default/last settings when the user turn on some home appliance devices through the digital assistant.

In some embodiments, the digital assistant system can also bring some recommendations to the recognized user based his/her past usage data.

Refer to FIG. 5A, in some embodiments, during the registration stage, a lookup table is created for the digital assistant. The look-up table includes devices that are controllable through the digital assistant (e.g., device X, device Y, etc.). For a home assistant, the devices that can be controlled via the digital assistant may include the air conditioners in different rooms, the audio systems in the house, the home security system, the kitchen appliances, the lights in the house, etc. The registration process can be on going, and new devices can be added to the look-up table over time. In some embodiments, the default is to grant permission to each new device to the existing users already registered in the table, and the user registering the new device can ask the digital assistant to change the permission for a particular user in the table from permitted to not permitted specifically. In some embodiments, new users can be added to the look-up table through a user registration process. All users in the look-up table are users authorized to control the digital assistant regardless of whether the user has permission to access all devices in the look-up table. The look-up table serves as a whitelist for authorized users that have control for the digital assistant. Since digital assistants are not included in the look-up table, the simulated voice cannot activate the digital assistant and start the intent deduction process.

In some embodiments, a user blacklist is created indicating which user's voices cannot be used to trigger the intent deduction process using the predefined wake-up-word. For example, the digital assistants can be included in the user blacklist, and a guest or child's voice can be included in the blacklist. Using a blacklist is a strong measure, and when a user or system is included in the black list, not only does the intent deduction not triggered when the trigger word is present in the audio speech input, in some embodiments, the speech-to-text conversion is also skipped.

In some embodiments, during the registration process, each user that is being registered is requested by the digital assistant or the server thereof to utter some sample speech inputs, and the sample speech inputs are recorded and stored by the digital assistant or the server thereof. The digital assistant or the server thereof uses the recorded sample speech input to adapt the automated speech recognition acoustic models to each registering user, and generate a respective set of user-specific acoustic models for speech recognition for each registered user.

In some embodiments, a simple approach for adapting the default acoustic models of the speech recognition model to an individual registered user is to calculate the means of acoustic features of the recorded phrases for the registered user first. Then, determine the difference between the speaker-specific means and the speaker-independent means of the acoustic models. In some embodiments, the speaker independent means of the acoustic models can be prepared by the digital assistant system beforehand. The speaker-specific differences for each individual registered user are taken into account on fly during the speech recognition for the speech input uttered by the individual registered user.

In some embodiments, more sophisticated approaches such as maximum likelihood linear regression (MLLR), maximum a posteriori (MAP) and Eigenvoices can be used. Reference information on these methods can be found at https://www.inf.ed.ac.uk/teaching/courses/asr/2008-9/asr-adapt-1×2.pdf https://wiki.infed.ac.uk/pub/CSTR/ListenSemester1_2007_8/kuhn-junqua-eigenvoice-ics1p1998.pdf, for example.

In some embodiments, the recorded phrases received from all the registered users are used to train a speaker recognition model. The speaker recognition model is relatively simple to train and is lightweight, so that speaker recognition can be performed locally at the location of the speaker (e.g., on the home assistant device client side) without requiring server involvement. Once the speaker is recognized, the speaker identity can be sent to the server along with the speech input, in some embodiments.

In some embodiments, the user is required to utter the trigger word a few times, and the speaker recognition is a text-dependent speaker recognition process. When a user utters the wake-up word to the digital assistant system, the digital assistant system compare the input speech of trigger word against the pre-recorded set of trigger words and determine the best matched user.

In some embodiments, the entire utterance is used in a text-independent speaker recognition process. Reference information on text-independent speaker recognition can be found at https://en.wikipedia.org/wiki/Speaker_recognition, for example.

Refer to FIG. 5B, in some embodiments, in the operation stage of the digital assistant system, an input speech is sent to a speech recognition module and a speaker recognition module, respectively. In some embodiments, the speech input is not sent to the speech recognition module until the speaker recognition module has recognized the speaker as a registered user that is authorized to control the digital assistant.

In some embodiments, after the speaker is recognized, the digital assistant is activated and ready to perform intent deduction if the user recognized to be one of the registered users in user whitelist and not in the user blacklist. In some embodiments, the intent deduction and/or speech-to-text conversion is skipped if the user is not recognized to be one of the registered users in the whitelist or if the user is recognized to be in the user blacklist.

In some embodiments, the digital assistant does not take any action to execute a requested if the user does not have access permission to the assistant-controlled device that the user intends to access. If the digital assistant determines that the user has permission to the assistant-controlled device, the digital assistant follows the user's command to do the operation on the specified device, and/or bring back the default/last settings for this user.

In some embodiments, based on the recognized user's past usage data, the digital assistant gives the user recommendations or reminders regarding the devices that the user has asked to access.

Ins some embodiments, a method of operating a digital assistant system is performed at an electronic device including one or more processors and memory storing instructions for execution by the one or more processors (e.g., the electronic device 104). The method includes: receiving an audio input; performing speaker recognition on the audio input; in accordance with a determination that the audio input includes a voice input from a first user that is authorized to control the home assistant device: performing speech-to-text conversion on the audio input to obtain a textual string; and searching for a predefined trigger word for activating the home assistant device (e.g., starting intent deduction for the next audio input or the audio input immediately succeeding the audio input) in the textual string; and in accordance with a determination that the audio input includes a voice input from the home assistant device: forgoing performance of speech-to-text conversion on the audio input; and forgoing search for the predefined trigger word.

In some embodiments, searching for the predefined trigger word in the textual string includes: selecting a respective trigger word that corresponds to the first user from a plurality of preset trigger words that correspond different users among a plurality of users that include the first user; and using the respective trigger word that corresponds to the first user as the predefined trigger word that is to be searched.

In some embodiments, the method includes: in accordance with a determination that the audio input includes a voice input from the first user that is authorized to control the home assistant device: selecting, from a plurality of task domains of the home assistant device, one or more first task domains that the first user is authorized to control, to perform intent deduction on the textual string; and forgoing using one or more second task domains among the plurality of task domains that the first user is not authorized to control to process the textual input.

In some embodiments, the method include: obtaining a default speech-to-text model corresponding to the home assistant device; and in accordance with a determination that a plurality of recorded speech samples provided by the first user are available, adjusting the default speech-to-text model in accordance with the plurality of speech samples provided by the first user to generate a first user-specific speech-to-text model for the first user, wherein performing speech-to-text conversion on the audio input to obtain the textual string includes performing speech-to-text conversion on the audio input using the first user-specific speech-to-text model for the first user. In some embodiments, in accordance with a determination that a plurality of recorded speech samples provided by the first user are not available, performing the speech-to-text conversion on the audio input using the default speech-to-text model. In some embodiments, in accordance with a determination that a plurality of recorded speech samples provided by the first user are available, setting a first confidence threshold for recognizing the trigger word in the audio input when the first user-specific speech-to-text model is used to perform the speech-to-text conversion on the audio input; and in accordance with a determination that a plurality of recorded speech samples provided by the first user are not available, setting a second confidence threshold for recognizing the trigger word in the audio input when the default speech-to-text model is used to perform the speech-to-text conversion on the audio input. In some embodiments, the first confidence threshold that is used for the first user-specific speech-to-text model is higher than the second confidence threshold that is used for the default speech-to-text model.

Referring to FIG. 5C, for a respective user that registers a smart home device with the digital assistant system, the respective user specifies a unique alias for each of the devices that he/she is registering, and the digital assistant creates a name list for all the registered devices for each user.

In Registration stage, when a registered user registers devices in a home through the home assistant system, the home assistant system suggests to the user to give an alias to each device that is being registered. Different users is permitted to give different names to the same device, and the home assistant system displays or output the names other registered users in the household have given the same device, once the user enters the unique serial number of the device to the home assistant system. The smart home assistant allows the user to choose the same alias for the device as other user, and allows the user to choose a different alias for the device from the alias chosen by other users.

For each of the registered user that is registering the device, the home assistant system creates a triple for each device (device name, device type, serial number), and send all triples to digital assistant server, where the server stores the name list for all devices for all registered users in the household under the unique household identifier of the household. In some embodiments, an alias only needs to be given to a device once by one of the registered users of the household, and another user merely needs to opt-in to use the aliases chosen by another registered user. In some embodiments, the digital assistant requires at least one confirmation from a first user to use an alias for a device registered by another user, when the first user utters that alias for the first time in the context of using the device of that type.

In some embodiments, the name list for the devices contains devices of either various types of appliances or of a single type of appliance. For example, the same device can be given multiple different aliases for the same user or for different users, and each one of them would be treated as the name for the device when used by the corresponding user(s). Different devices of the same device type may have different aliases. A user may use their respective aliases to operate them, or use a generic name of the type of device to let the digital home assistant disambiguate the user's intent based on other means, such as descriptive terms in the user's utterance or the user's location, or the user's past preferences, etc.

In some embodiments, the digital home assistant server auto-generates a home ID for the home when a first home device from that home is being registered with the digital home assistant. The name list of the devices in the home are retrieved based on the unique identifier of the home.

In some embodiments, in intent classification and named entity recognition stage, the textual string obtained from the user's voice input and home ID of the home are sent to the digital home assistant system, e.g., after the process for speaker recognition and speech-to-text conversion is completed. The digital home assistant system retrieves the list of home devices that have been registered for the home from server database by using home ID as the search key.

The system uses the info from the retrieved list in intent classification and named entity recognition. Such info helps to improve the accuracies of intent classification and named entity recognition. The info of type of device will help the system identify the intent of input text, for example, to turn on an air-conditioner rather than to turn on a fan or turn on a radio. The info of serial number will let the system know which device to control. The info of device name will help the system to correctly identify the named entity from a command phrase.

Figure 6:
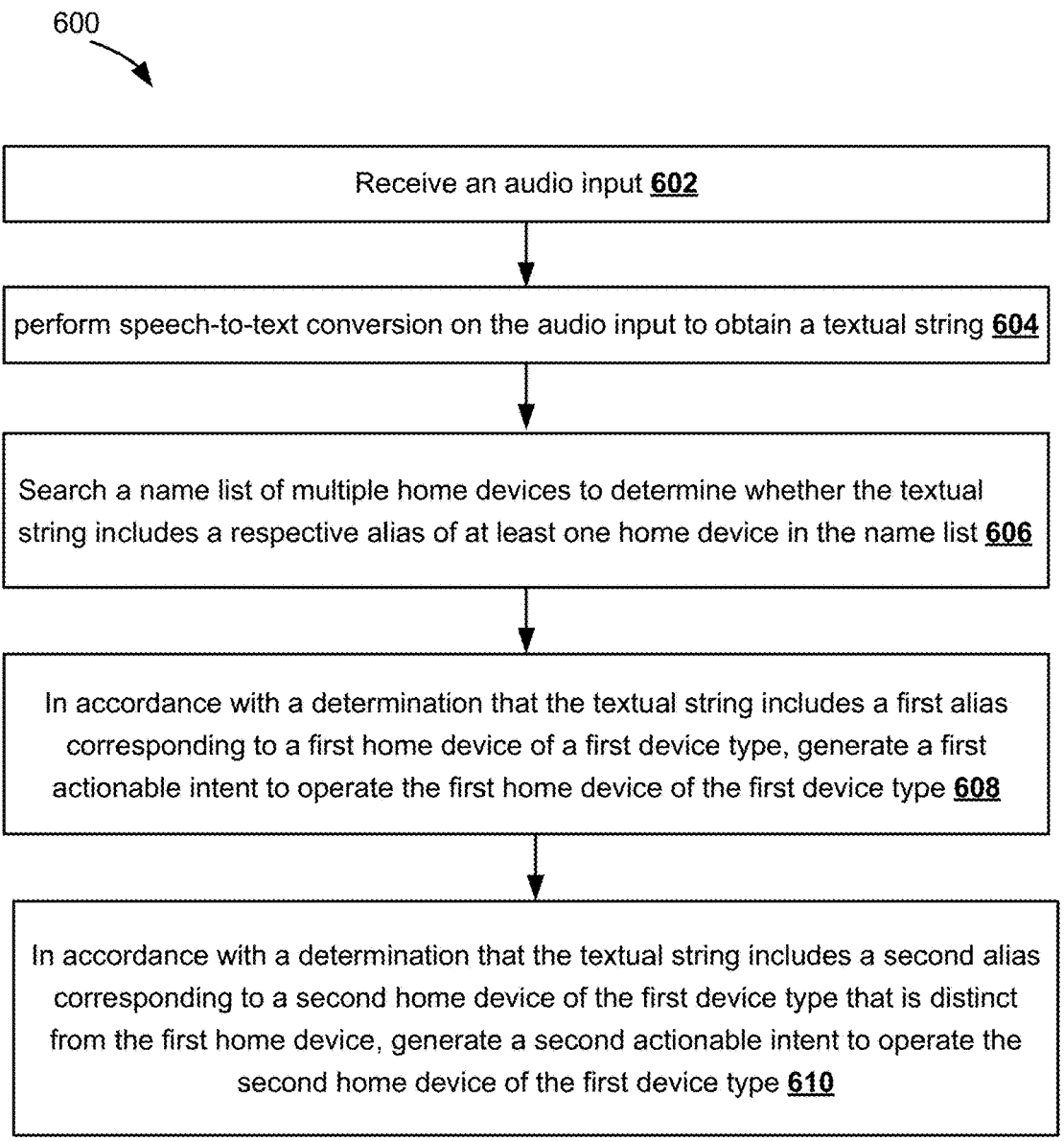
FIG. 6 is a flowchart illustrating methods for controlling and operating a digital assistant system to control multiple home devices, in accordance with some embodiments.

FIG. 6 is a flow diagram representing methods for operating a digital assistant to control home devices, in accordance with some embodiments. The methods are, optionally, governed by instructions that are stored in a computer memory or non-transitory computer readable storage medium (e.g., memory 250 of client device 104, memory 302 associated with the digital assistant system 300) and that are executed by one or more processors of one or more computer systems of a digital assistant system, including, but not limited to, the server system 108, and/or the user device 104-a. The computer readable storage medium may include a magnetic or optical disk storage device, solid-state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in each method may be combined and/or the order of some operations may be changed from the order shown in the figures. Also, in some embodiments, operations shown in separate figures and/or discussed in association with separate methods may be combined to form other methods, and operations shown in the same figure and/or discussed in association with the same method may be separated into different methods. Moreover, in some embodiments, one or more operations in the methods are performed by modules of the digital assistant system 300 and/or an electronic device (e.g., the user device 104), including, for example, the natural language processing module 332, the dialogue flow processing module 334, the audio subsystem 226, and/or any sub modules thereof.

FIG. 6 illustrates a method 600 of operating a digital assistant system according to some embodiments. In some embodiments, the method 600 is performed at an electronic device including one or more processors and memory storing instructions for execution by the one or more processors (e.g., the electronic device 104). The method includes: receiving (602) an audio input; performing (604) speech-to-text conversion on the audio input to obtain a textual string; searching (606) a name list of multiple home devices to determine whether the textual string includes a respective alias of at least one home device in the name list; in accordance with a determination that the textual string includes a first alias corresponding to a first home device of a first device type, generating (608) a first actionable intent to operate the first home device of the first device type; and in accordance with a determination that the textual string includes a second alias corresponding to a second home device of the first device type that is distinct from the first home device, generating (610) a second actionable intent to operate the second home device of the first device type.

In some embodiments, the method includes: registering the first home device of the first device type in response to a first device registration request received from a first user; and registering the second home device of the first device type in response to a second device registration request received from a second user that is distinct from the first user. In some embodiments, the method includes: in response to receiving the audio input, performing speaker recognition on the audio input, wherein generating the first actionable intent to operate the first home device is performed in accordance with a determination that the speaker recognition indicates that the audio input is provided by the first user, and in accordance with a determination that the first alias is registered by the first user for the first home device. In some embodiments, the method includes: in accordance with a determination that the textual string includes the first alias corresponding to the first home device, and in accordance with a determination that the first alias is not an alias registered by the first user for the first home device, forgoing generation of the first actionable intent to operate the first home device.

In some embodiments, the method includes: receiving from a first user, in conjunction with a first home identifier, a first device registration request for the first home device of the first device type; in response to receiving the first device registration request, determining whether another device of the first device type has already been registered under the first home identifier; and in accordance with a determination that at least one other home device of the first device type has already been registered under the first home identifier by another user distinct from the first user, providing, to the first user, respective aliases of the at least one other home devices of the first device type that have been registered under the first home identifier. In some embodiments, providing the respective aliases of the at least one other home devices of the first device type that have been registered under the first home identifier includes: providing an alert to the first user in accordance with a determination that a respective alias given to the first device in the first device registration request is identical to a respective alias given to at least one of the at least one other devices of the first device type that have been registered under the first home identifier. In some embodiments, the method includes: receiving user confirmation for registering the first device using the respective alias in the first device registration request; and registering the first device with the respective alias in the first device registration request in the name list in accordance with a determination that the respective alias in the first device registration request has not been given to other devices that have been registered by the first user.

The foregoing description, for purpose of explanation, has been described with reference to specific embodiments. However, the illustrative discussions above are not intended to be exhaustive or to limit the disclosed embodiments to the precise forms disclosed. Many modifications and variations are possible in view of the above teachings. The embodiments were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of controlling a home assistant device, comprising:
at a computing system having one or more processors and memory:
receiving an audio input;
performing speech-to-text conversion on the audio input to obtain a textual string;
searching a name list of multiple home devices to determine whether the textual string includes a respective alias of at least one home device in the name list;
in accordance with a determination that the textual string includes a first alias corresponding to a first home device of a first device type, generating a first actionable intent to operate the first home device of the first device type; and
in accordance with a determination that the textual string includes a second alias corresponding to a second home device of the first device type that is distinct from the first home device, generating a second actionable intent to operate the second home device of the first device type,
the method further including:
receiving from a first user, in conjunction with a first home identifier, a first device registration request for the first home device of the first device type;
in response to receiving the first device registration request, determining whether another device of the first device type has already been registered under the first home identifier; and
in accordance with a determination that at least one other home device of the first device type has already been registered under the first home identifier by another user distinct from the first user, providing, to the first user, respective aliases of the at least one other home devices of the first device type that have been registered under the first home identifier.

2. The method of claim 1, including:
registering the first home device of the first device type in response to a first device registration request received from a first user; and
registering the second home device of the first device type in response to a second device registration request received from a second user that is distinct from the first user.

3. The method of claim 2, including:
in response to receiving the audio input, performing speaker recognition on the audio input, wherein generating the first actionable intent to operate the first home device is performed in accordance with a determination that the speaker recognition indicates that the audio input is provided by the first user, and in accordance with a determination that the first alias is registered by the first user for the first home device.

4. The method of claim 3, including:
in accordance with a determination that the textual string includes the first alias corresponding to the first home device, and in accordance with a determination that the first alias is not an alias registered by the first user for the first home device, forgoing generation of the first actionable intent to operate the first home device.

5. The method of claim 1, wherein providing the respective aliases of the at least one other home devices of the first device type that have been registered under the first home identifier includes:
providing an alert to the first user in accordance with a determination that a respective alias given to the first device in the first device registration request is identical to a respective alias given to at least one of the at least one other devices of the first device type that have been registered under the first home identifier.

6. The method of claim 5, including:
receiving user confirmation for registering the first device using the respective alias in the first device registration request; and
registering the first device with the respective alias in the first device registration request in the name list in accordance with a determination that the respective alias in the first device registration request has not been given to other devices that have been registered by the first user.

7. A system for controlling a home assistant device, comprising:
one or more processors; and
memory storing instructions, the instructions, when executed by the processors, cause the processors to perform operations comprising:
receiving an audio input;
performing speech-to-text conversion on the audio input to obtain a textual string;
searching a name list of multiple home devices to determine whether the textual string includes a respective alias of at least one home device in the name list;
in accordance with a determination that the textual string includes a first alias corresponding to a first home device of a first device type, generating a first actionable intent to operate the first home device of the first device type; and
in accordance with a determination that the textual string includes a second alias corresponding to a second home device of the first device type that is distinct from the first home device, generating a second actionable intent to operate the second home device of the first device type, wherein the operations further include:
receiving from a first user, in conjunction with a first home identifier, a first device registration request for the first home device of the first device type;
in response to receiving the first device registration request, determining whether another device of the first device type has already been registered under the first home identifier; and
in accordance with a determination that at least one other home device of the first device type has already been registered under the first home identifier by another user distinct from the first user, providing, to the first user, respective aliases of the at least one other home devices of the first device type that have been registered under the first home identifier.

8. The system of claim 7, wherein the operations further include:
registering the first home device of the first device type in response to a first device registration request received from a first user; and
registering the second home device of the first device type in response to a second device registration request received from a second user that is distinct from the first user.

9. The system of claim 8, wherein the operations further include:
in response to receiving the audio input, performing speaker recognition on the audio input, wherein generating the first actionable intent to operate the first home device is performed in accordance with a determination that the speaker recognition indicates that the audio input is provided by the first user, and in accordance with a determination that the first alias is registered by the first user for the first home device.

10. The system of claim 9, wherein the operations further include:
in accordance with a determination that the textual string includes the first alias corresponding to the first home device, and in accordance with a determination that the first alias is not an alias registered by the first user for the first home device, forgoing generation of the first actionable intent to operate the first home device.

11. The system of claim 7, wherein providing the respective aliases of the at least one other home devices of the first device type that have been registered under the first home identifier includes:
providing an alert to the first user in accordance with a determination that a respective alias given to the first device in the first device registration request is identical to a respective alias given to at least one of the at least one other devices of the first device type that have been registered under the first home identifier.

12. The system of claim 11, wherein the operations further include:
receiving user confirmation for registering the first device using the respective alias in the first device registration request; and
registering the first device with the respective alias in the first device registration request in the name list in accordance with a determination that the respective alias in the first device registration request has not been given to other devices that have been registered by the first user.

13. A non-transitory computer-readable storage medium storing instructions, the instructions, when executed by one or more processors, cause the processors to perform operations comprising:
receiving an audio input;
performing speech-to-text conversion on the audio input to obtain a textual string;
searching a name list of multiple home devices to determine whether the textual string includes a respective alias of at least one home device in the name list;
in accordance with a determination that the textual string includes a first alias corresponding to a first home device of a first device type, generating a first actionable intent to operate the first home device of the first device type; and
in accordance with a determination that the textual string includes a second alias corresponding to a second home device of the first device type that is distinct from the first home device, generating a second actionable intent to operate the second home device of the first device type, wherein the operations further include:
receiving from a first user, in conjunction with a first home identifier, a first device registration request for the first home device of the first device type;
in response to receiving the first device registration request, determining whether another device of the first device type has already been registered under the first home identifier; and
in accordance with a determination that at least one other home device of the first device type has already been registered under the first home identifier by another user distinct from the first user, providing, to the first user, respective aliases of the at least one other home devices of the first device type that have been registered under the first home identifier.

14. The computer-readable storage medium of claim 13, wherein the operations further include:
registering the first home device of the first device type in response to a first device registration request received from a first user; and
registering the second home device of the first device type in response to a second device registration request received from a second user that is distinct from the first user.

15. The computer-readable storage medium of claim 14, wherein the operations further include:
in response to receiving the audio input, performing speaker recognition on the audio input, wherein generating the first actionable intent to operate the first home device is performed in accordance with a determination that the speaker recognition indicates that the audio input is provided by the first user, and in accordance with a determination that the first alias is registered by the first user for the first home device.

16. The computer-readable storage medium of claim 15, wherein the operations further include:
in accordance with a determination that the textual string includes the first alias corresponding to the first home device, and in accordance with a determination that the first alias is not an alias registered by the first user for the first home device, forgoing generation of the first actionable intent to operate the first home device.

17. The computer-readable storage medium of claim 13, wherein providing the respective aliases of the at least one other home devices of the first device type that have been registered under the first home identifier includes:
providing an alert to the first user in accordance with a determination that a respective alias given to the first device in the first device registration request is identical to a respective alias given to at least one of the at least one other devices of the first device type that have been registered under the first home identifier.

* * * * *